United States Patent [19]

Scroggie et al.

[11] Patent Number: 5,054,574
[45] Date of Patent: Oct. 8, 1991

[54] CONTROL FOR AUTOMOTIVE PASSIVE RESTRAINT SYSTEM WITH MANUAL RETRIGGER

[75] Inventors: David E. Scroggie, Union Lake; Timothy K. Willis, Northville; Keith R. Waineo, Farmington Hills, all of Mich.

[73] Assignee: Ford Motor Company, Dearborn, Mich.

[21] Appl. No.: 488,171

[22] Filed: Mar. 5, 1990

[51] Int. Cl.⁵ ............................................. B60R 22/06
[52] U.S. Cl. .................................. 180/268; 280/804; 297/483
[58] Field of Search ............... 280/804, 802, 803, 807, 280/808; 297/469, 474, 485, 464, 468, 483; 180/268

[56] References Cited

U.S. PATENT DOCUMENTS

| | | | |
|---|---|---|---|
| 4,236,729 | 12/1980 | Suzuki et al. | 280/804 |
| 4,291,897 | 9/1981 | Minami | 280/802 |
| 4,343,489 | 10/1982 | Suzuki et al. | 280/804 |
| 4,380,751 | 4/1983 | Takada | 280/804 |
| 4,410,061 | 10/1983 | Terabayashi | 180/270 |
| 4,730,844 | 3/1986 | Patterson | 280/804 |
| 4,896,742 | 1/1990 | Shitanoki et al. | 280/804 |

Primary Examiner—Richard A. Bertsch

[57] ABSTRACT

A passive restraint system includes a torso belt automatically securing a vehicle occupant by moving from a forward position along a track to a rearward position to secure the occupant. A belt carrier carries one end of the torso belt along the track while the other end of the torso belt is retained on a belt retractor. Inadvertent latching of the retractor latching mechanism during movement of the belt carrier to the rearward position may cause stalling of the belt carrier. A manual retrigger is provided whereby the vehicle occupant may reinitiate the movement of the belt carrier once the latched belt is released.

9 Claims, 4 Drawing Sheets

CONTROL FOR AUTOMOTIVE PASSIVE RESTRAINT SYSTEM WITH MANUAL RETRIGGER

BACKGROUND OF THE INVENTION

The present invention relates in general to automotive passive restraint systems, and more particularly to a control circuit for a motorized passive restraint system.

The passive restraint system in a motor vehicle is responsible for providing automatic seatbelt protection to the vehicle occupants. The operation of the system is defined according to certain conditions such as the open or closed position of a door and the occurrence of certain events, such as the turning on of the vehicle ignition switch. As required, a torso belt of the passive restraint system will travel along a track from a forward position to a rearward position to secure an occupant. Other conditions and events will cause the torso belt to travel to the forward position to allow an occupant to enter or leave the vehicle.

The torso belt travels by means of a motor-driven carrier riding in a track along the door frame. As the belt carrier moves from the "A" pillar at the forward position toward the "B" pillar at the rearward position, the torso belt spools out of a retractor usually located at the base of the vehicle seat at the opposite side of the occupant from the door. The unspooling of the torso belt provides sufficient belt length to extend from the retractor, around the vehicle occupant, and to the rearward position of the belt carrier at the "B" pillar.

The belt retractor normally includes a latch mechanism which prevents unspooling of the belt during large accelerations or decelerations, such as in a collision. In the event that the retractor latching mechanism becomes engaged during movement of the belt carrier toward the rearward position, the belt carrier may stall somewhere between the forward and rearward positions since there will be insufficient slack of the torso belt to allow further movement of the belt carrier. This unintended latching of the retractor can occur, for example, when the vehicle occupant adjusts the seat position during belt carrier movement. The sudden movement of the occupant and the seat causes the retractor to latch, and in turn causes the belt carrier to stall.

The belt carrier is driven by a reversible electric motor through a drivebelt which interconnects the belt carrier and the motor. In order to avoid overheating and possible damage to the electric motor during a stall condition, the motor control circuit includes a timer which limits the duration of time for which the motor is energized. A time period is selected which is longer than the normal amount of time required for travel of the belt carrier between opposite positions and is short enough to avoid motor damage in the event of a stalled condition.

When a stall condition occurs due to the latching of the belt retractor, the motor timer can time out thereby removing power from the motor and leaving the belt carrier undesirably stalled somewhere between the forward and rearward positions. Warning lights or audible signals are typically activated to indicate that the belt carrier has not reached the intended position.

In order to deactivate the warning signals in prior art systems, the vehicle occupant must reenergize the passive restraint system to bring the belt carrier into the proper position by either opening a vehicle door or turning the vehicle ignition off and on again.

SUMMARY OF THE INVENTION

It is a principal object of the present invention to provide a passive restraint system wherein a stall condition of the belt carrier can be easily corrected by a vehicle occupant.

It is a further object of the invention to allow manual input by a vehicle occupant in order to correct a stall condition without enabling the occupant to defeat or circumvent the passive restraint system.

These and other objects are achieved by employing a carrier motor control circuit which includes a stall retrigger which is manually operated by a vehicle occupant when a stall condition occurs of the belt carrier. The stall retrigger circuit restarts the motor timer to allow the belt carrier to again attempt to travel to its desired position. In a preferred embodiment, the stall retrigger is activated when the torso belt is disengaged from the belt carrier thereby ensuring that the torso belt no longer restricts movement of the belt carrier and the belt carrier will be free to move to the desired location. Thus, a manual stall retrigger switch can be provided in the torso belt buckle located in the belt carrier or in the retractor to sense spooling of the torso belt onto the retractor. Alternatively, a retrigger switch can be provided for manual actuation on the dashboard or the console of the vehicle. Visible and/or audible warning signals discourage the unbuckling of the torso belt from the belt carrier during vehicle usage.

BRIEF DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings, in which:

DETAILED DESCRIPTION OF PREFERRED EMBODIMENTS

Figure 1:
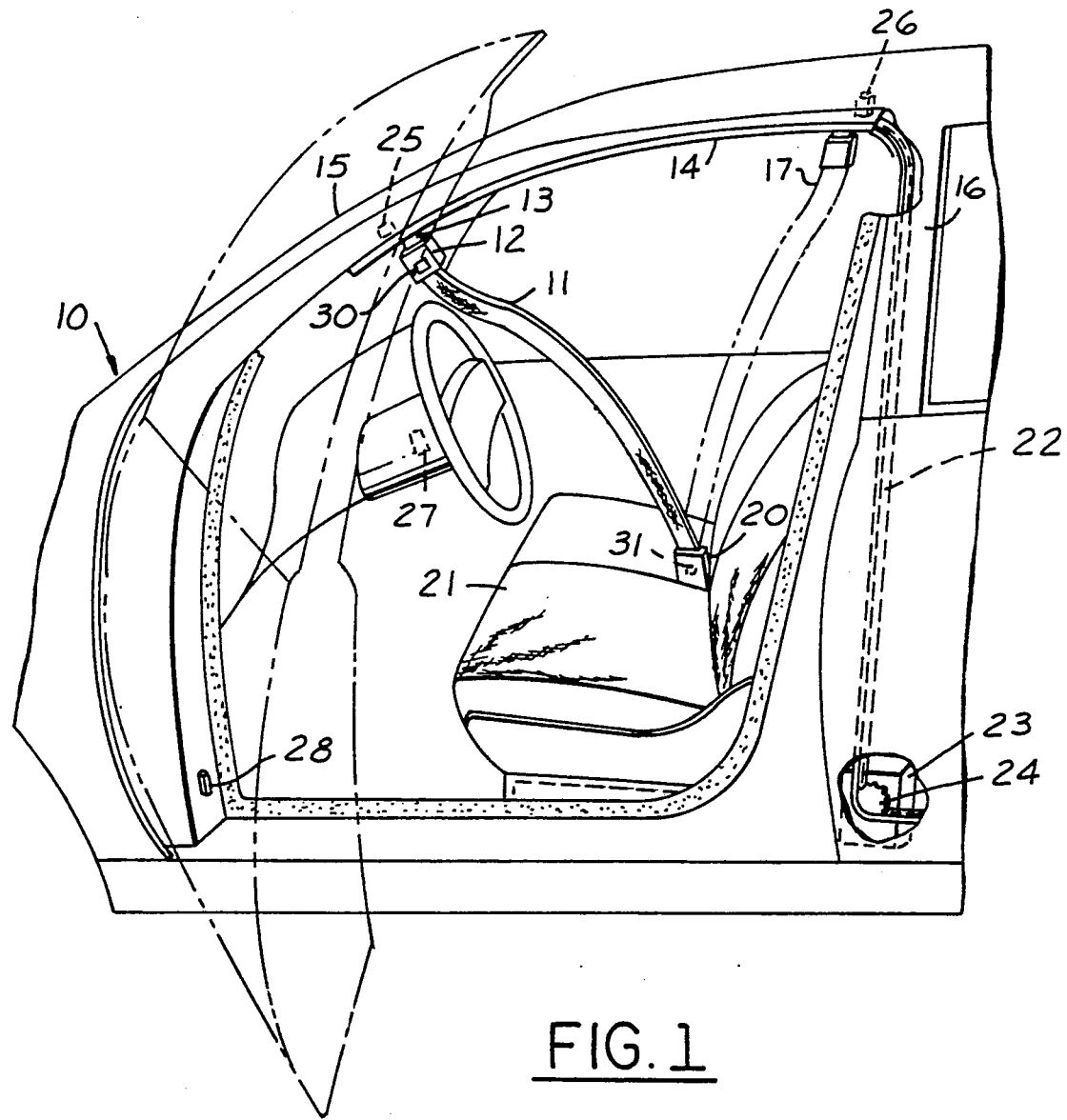
FIG. 1 is a partial perspective view of a vehicle including a passive restraint system.

Referring to FIG. 1, a vehicle generally designated as 10 has a passive restraint belt system including a torso belt 11. At one end of torso belt 11 is an emergency release buckle 12 which releasably connects with a belt carrier 13. Belt carrier 13 is received for slidable movement in a track 14 which extends from the front or "A" pillar 15 to the rear or "B" pillar 16. Track 14 is affixed to the vehicle roof so that belt carrier 13 can be driven between a forward position at the "A" pillar and a rearward position at the "B" pillar as shown in phantom at 17.

The other end of torso belt 11 is received within a latchable retractor 20 which is secured to the floor of the vehicle near the bottom edge of a seat 21. Torso belt 11 is free to spool in or out from retractor 20 during movement of belt carrier 13 (except that belt 11 cannot spool out when retractor 20 becomes latched due to an acceleration exceeding a predetermined acceleration). With an occupant located in seat 21 and with belt carrier 13 moving from a forward to a rearward position, torso belt 11 will be required to spool out from retractor 20 to provide sufficient length of the torso belt 11 to extend from retractor 20, around the occupant, and to the "B" pillar location of belt carrier 13.

Belt carrier 13 is connected to a drivebelt 22 within track 14. Drivebelt 22 extends through track 14 from belt carrier 13 to a motor 23 and engages a sprocket wheel 24 driven by motor 23. Thus, rotation of motor 23 in one direction causes movement of belt carrier 13 toward a rearward position and rotation of motor 23 in the opposite direction causes movement of belt carrier 13 toward a forward position. A pair of limit switches 25 and 26 sense the presence of belt carrier 13 at the forward and rearward positions, respectively.

The correct location of the passive restraint belt carrier at any moment is dependent on certain monitored conditions, including the state of an ignition switch 27 which may be either on or off. A door switch 28 provides a signal which indicates the open or closed position of its respective vehicle door. Furthermore, movement of belt carrier 13 is dependent on the occurrence of a trigger event which initiates belt carrier movement. Following a trigger event, a time period of limited duration begins during which motor 23 is energized.

In order to eliminate the problem of having to either turn the ignition on and off or open and close a door in response to a stalled belt carrier, and in order to enable the retriggering of the motor timer, the present invention provides manually activated retrigger means to cause the motor to again be energized for the limited time period. In one embodiment, the present invention provides an emergency release button 30 on emergency release buckle 12 which includes an electrical switch connected to signal the restraint system control electronics (not shown) to initiate a retrigger sequence. In an alternative embodiment, the retrigger means includes a retractor switch 31 located within retractor 20 which detects the respooling of torso belt 11 into retractor 20 (i.e., after removing the emergency release buckle from the belt carrier) to signal the control electronics.

Figure 1A:
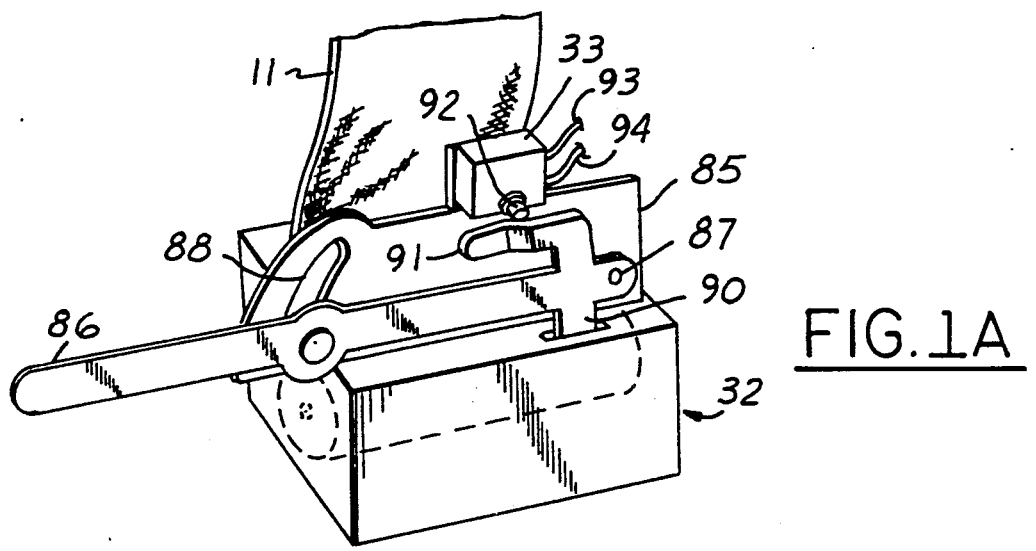
FIG. 1A is a partial perspective view of a belt retractor including a manual retrigger switch of the present invention.

Another alternative embodiment shown in FIG. 1A incorporates a retrigger switch 33 with a latch and release mechanism 32 formed in conjuction with the retractor. A plate 85 supports a lever 86 which pivots about a pivot pin 87 under control of a guide slot 88. A release arm 90 extends from lever 86 into latch and release mechanism 32 to disengage the latching mechanism (not shown) when lever 86 is pulled upward.

A switch arm 91 also extends from lever 86. When lever 86 is pulled upward, switch arm 91 contacts a plunger 92 in retrigger switch 33 so that plunger 92 is forced into the body of switch 33 to close the switch. Signal wires 93 and 94 connect switch 33 to the restraint system control electronics (not shown). In operation, placing lever 86 in an upward position simultaneously releases a latched belt retractor and sends a retrigger signal to cause the retriggering of the motor timer.

Figure 2:
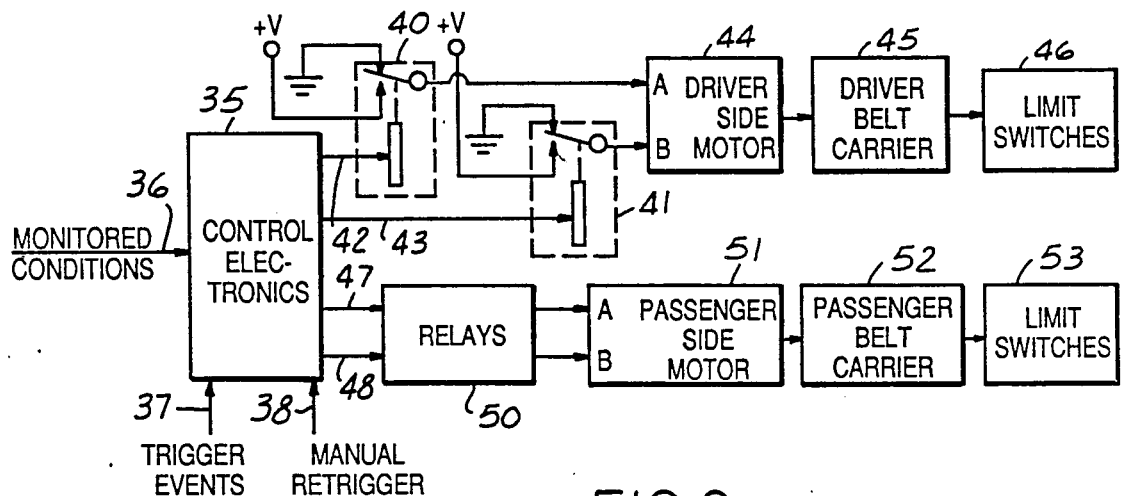
FIG. 2 is a schematic, block diagram of portions of the passive restraint system.

Turning now to FIG. 2, control electronics 35 controls the operation of the passive restraint belt drive motors for the driver side and passenger side as shown. Control electronics 35 senses a plurality of predetermined monitored conditions over a group of sensing lines 36, senses a plurality of trigger events over a group of sensing lines 37, and monitors the occurrence of a manual retrigger over a signal line 38.

The driver side of the passive restraint system includes a relay 40 connected to be energized by control electronics 35 on a control line 42 and a relay 41 connected to be energized by control electronics 35 on a control line 43. The outputs of relays 40 and 41 are connected to a driver side belt motor 44 which is a reversible dc motor, the direction of rotation depending on the energizing of the motor at its "A" input or its "B" input by relays 40 or 41, respectively. Motor 44 is mechanically connected to a driver side belt carrier 45 which engages limit switches 46 depending on its position at either end of a track. The outputs of limit switches 46 are included in the monitored conditions sensed over sensing lines 36.

In operation, the monitored conditions on signal lines 36 corresponding to the driver side of the passive restraint system causes control electronics 35 to select the one of relays 40 or 41 which corresponds to the appropriate position of the belt carrier at either the "A" pillar or the "B" pillar. However, the selected relay is not energized unless a timer in control electronics 35 is activated by a trigger event over lines 37 or a manual retrigger over line 38. During the limited time period initiated by a trigger or a retrigger signal, control electronics 35 energizes the selected relay over corresponding control line 42 or 43 causing the selected relay to provide a voltage +V, supplied as shown, to energize motor 44. Movement of the belt carrier to the end of track at the desired position causes the opening of a corresponding limit switch which in turn causes control electronics 35 to deenergize the relay.

The passenger side of the passive restraint system is substantially identical to the driver side. Control electronics 35 is connected to a pair of relays 50 over control lines 47 and 48. Relays 50 are connected to an "A" input and "B" input of a passenger side belt motor 51 which provides motive power to a passenger side belt carrier 52. Limit switches 53 are provided for contact with passenger side belt carrier 52 at its front and rear positions.

Figure 3:
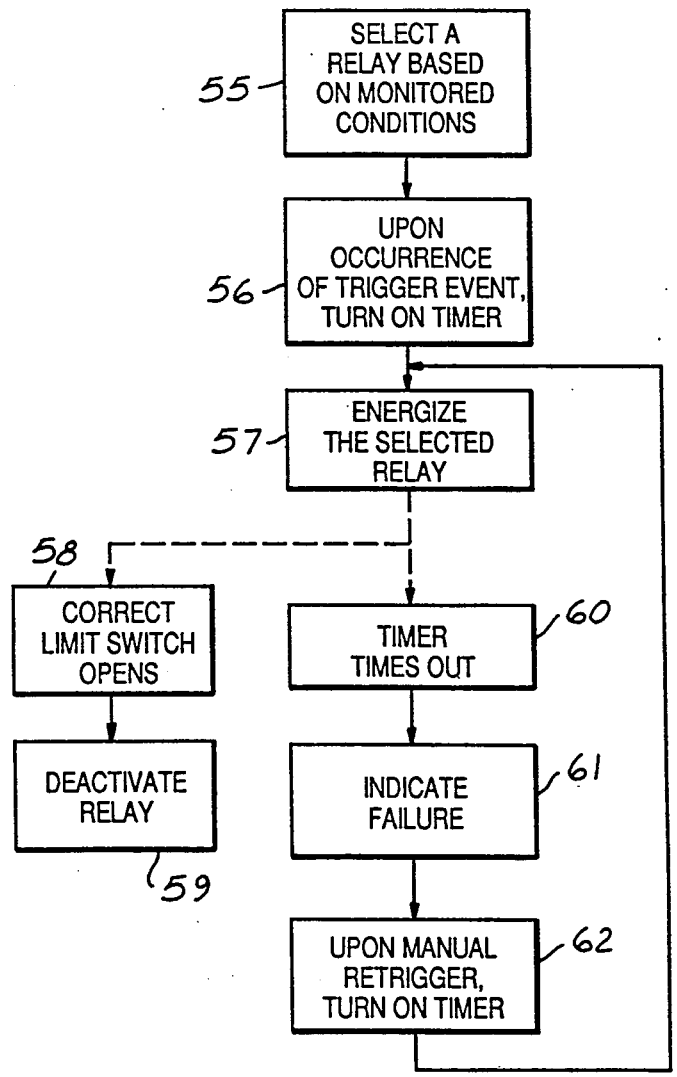
FIG. 3 is a flow chart illustrating operation of a passive restraint system.

The operation of the passive restraint system of FIG. 2 will be further described in connection with the flowchart in FIG. 3. In step 55, a relay is selected based on monitored conditions in the vehicle. Upon occurrence of a trigger event, a timer in control electronics is turned on in step 56. In response to the limited time period being triggered, the selected relay is energized in step 57. During normal operation of the passive restraint system, the belt carrier moves to the correct pillar position thereby opening the correct limit switch in step 58. This causes deactivation of the relay in step 59.

In the event that the belt carrier becomes stalled during its attempt to reach a selected position, the timer in the control electronics will time out in step 60 rather than reaching the end position to open a limit switch in step 58. When this occurs, the failure to reach the appropriate position is indicated in step 61 as by a visual display or an audible warning sound. In step 62, the vehicle occupant initiates a manual retrigger thereby turning on the timer in the control electronics for another attempt at moving the belt carrier to the appropriate position. Then, the selected relay is energized in step 57.

In the preferred embodiment, the manual retrigger is initiated by unbuckling the torso belt from the belt carrier thereby alleviating the cause for the stalled condition of the belt carrier. In other words, the movement of the belt carrier will no longer be restricted by the latched condition of the torso belt retractor. The vehicle occupant can then retract the belt onto the retractor to unlatch the retractor. The released belt can then be easily reattached to the belt carrier by the vehicle occupant. Alternatively, the manual retrigger can be initiated by the occupant using a manual switch located in conjunction with a retractor latch release lever or a hand-operated switch located on the dashboard or the vehicle console, for example.

Figure 4:
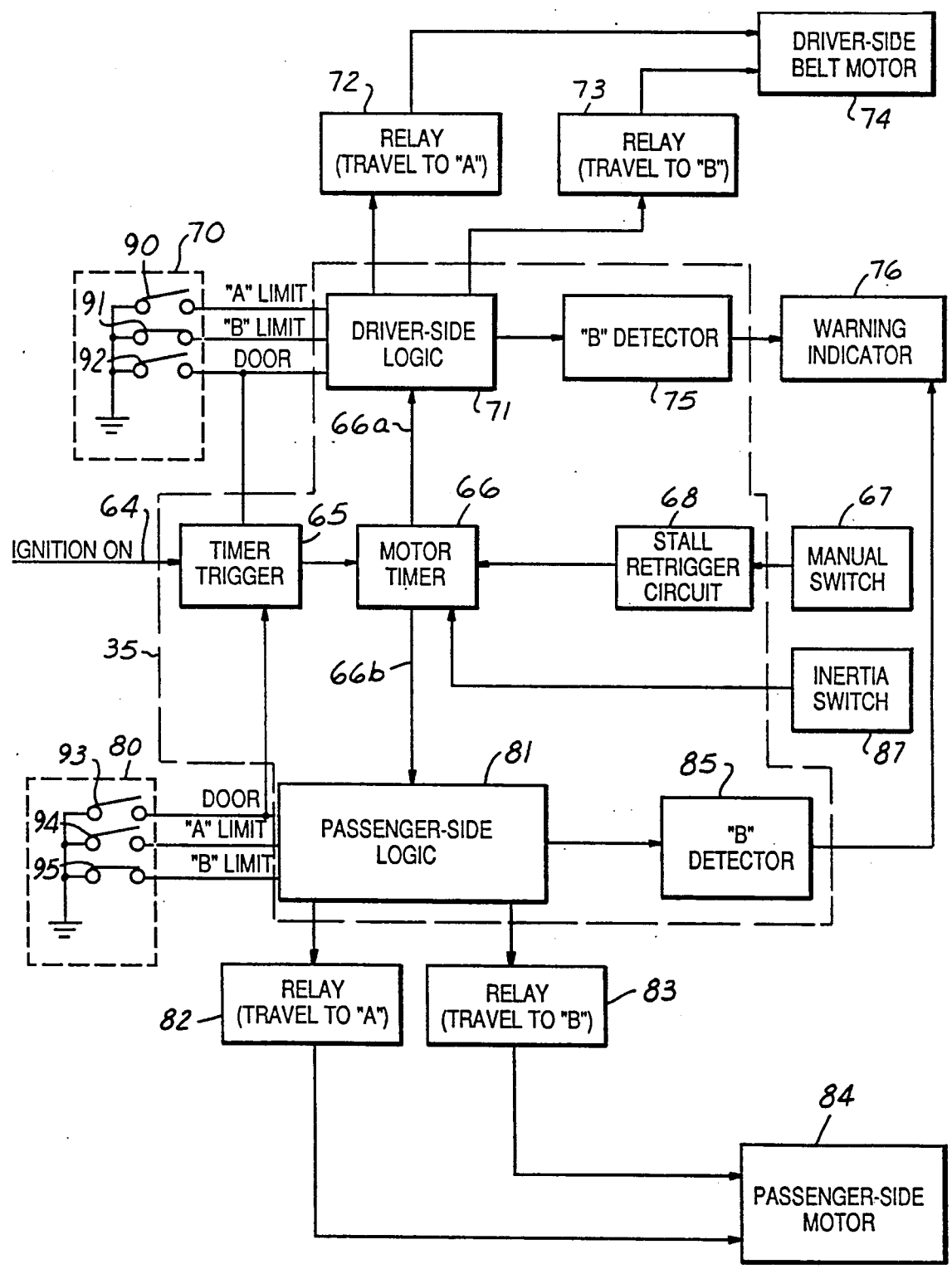
FIG. 4 is a detailed schematic, block diagram showing the electronic motor control system of the present invention.

Referring to FIG. 4, the electrical portion of the passive restraint system of the present invention is shown in greater detail. Control electronics module 35 includes a timer trigger 65 which receives an IGNITION ON signal on a line 64 when the ignition switch of the vehicle is in its run or start position. Timer trigger 65 may include a monostable multivibrator, for example. The output of timer trigger 65 is connected to an input of a motor timer 66. Motor timer 66 provides an output signal at its outputs 66a and 66b for a predetermined length of time (e.g., 7.5 seconds or some other period sufficient to allow full travel of the belt carrier) when it receives a trigger signal from timer trigger 65.

A manual switch 67 is actuable by a vehicle occupant when a stall condition occurs and is connected to a stall retrigger circuit 68. Stall retrigger circuit 68 may include a monostable multivibrator circuit which provides a signal to motor timer 66 to initiate the timing of motor timer 66 in response to the turning on of manual switch 67.

The driver side portion of the passive restraint system includes sensors 70 to monitor the predetermined conditions for determining the direction and triggering of the driver side belt carrier. An "A" limit switch 90, a "B" limit switch 91, and a door switch 92 each have one side connected to ground and another side connected to a driver side logic block 71. Door switch 92 is further connected to timer trigger 65.

Driver side logic 71 is connected to motor timer output 66a and has outputs connected to relays 72 and 73 which are connected to driver side belt motor 74. Driver side logic 71 has another output connected to a "B" detector 75 for determining the failure of the belt carrier to reach the rearward position at the "B" pillar. "B" detector 75 is connected to a warning indicator 76 for signaling a vehicle occupant that the belt carrier has failed to reach the "B" position.

The passenger side portion of the passive restraint system includes sensors 80, including a passenger door position switch 93, an "A" limit switch 94, and a "B" limit switch 95. Switches 93, 94, and 95 each have one side connected to ground and another side connected to passenger side logic block 81. Passenger door switch 93 is further connected to timer trigger 65. Passenger side logic 81 is connected to motor timer output 66b. A relay 82 and a relay 83 receive output signals from passenger side logic 81 and provide power to a passenger side motor 84. A "B" detector 85 receives an input from passenger side logic 81 and provides an output to warning indicator 76.

An inertia switch 87 for detecting large accelerations of the vehicle as would occur during a collision provides a signal to motor timer 66.

In operation, logic blocks 71 and 81 respectively select a belt carrier position at either the "A" pillar or the "B" pillar (i.e., one of the corresponding relays 72 or 73 and 82 or 83 are selected) based on the positions of their corresponding sensor switches 70 and 80. However, the selected relay is not energized unless a trigger event occurs and a signal is received from motor timer 66. Thus, when the ignition is turned on or when a door opens or closes, timer trigger 65 sends a trigger event signal to initiate the timing of motor timer 66.

When either the appropriate limit switch is opened by the belt carrier or motor timer 66 times out, the logic block 71 or 81 turns off the relay which had been energized. If motor timer 66 times out without the opening of the appropriate limit switch, the appropriate logic block 71 or 81 provides a signal to corresponding "B" detector 75 or 85. Upon receipt of the signal, "B" detector 75 or 85 energizes a warning indicator 76 until the stalled condition is corrected.

Inertia switch 87 senses the occurrence of a collision and inhibits the operation of motor timer 66. Thus, during a collision, the belt carriers will not be allowed to move no matter what the sensed conditions are, thus protecting the vehicle occupants.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. A passive restraint system for a vehicle comprising:
   a track extending between a forward position and a rearward position;
   a torso belt for restraining an occupant of said vehicle;
   a retractor having one end of said torso belt spooled thereon;
   a carrier movable in said track and releasably connected to the other end of said torso belt;
   a carrier motor for causing movement of said carrier;
   relay means connected to said carrier motor for providing electrical power to said carrier motor in a manner to cause selectable movement of said carrier toward either one of said positions;
   logic means coupled to said relay means for controlling the direction of said movement depending on predetermined conditions;
   motor timer means coupled to said relay means for establishing a limited time period during which said carrier motor can be energized and for causing said relay means to remove electrical power from said carrier motor after said carrier motor has been energized for said limited time period; and
   stall retrigger means coupled to said motor timer means for restarting said limited time period in response to a manual retrigger signal.

2. The system of claim 1 further comprising:
   timer trigger means coupled to said motor timer means for sensing predetermined events and for initiating said limited time period in response to the occurrence of a predetermined event, said predetermined events including the activation of a vehicle ignition and the opening and closing of a vehicle door.

3. The system of claim 1 further comprising:

an emergency release buckle releasably connecting said torso belt and said carrier; and stall manual switch means coupled to said stall retrigger means for generating said manual retrigger signal.

4. The system of claim 3 wherein said stall manual switch means is located in said emergency release buckle, said manual retrigger signal being generated when said emergency release buckle is opened.

5. The system of claim 3 wherein said stall manual switch means is located in said retractor, said manual retrigger signal being generated when said belt is being retracted.

6. A method for operating a carrier motor for a passive restraint system in a vehicle to locate a belt carrier in a proper forward or rearward position, said method comprising the steps of:

determining the proper location of said belt carrier depending on predetermined conditions including the state of a vehicle ignition switch, a door position switch, and a belt carrier position limit switch;

maintaining a timer for allowing energization of said carrier motor only during measured time periods, said time periods having a predetermined duration;

triggering said timer upon predetermined events including the opening or closing of a door or the turning on of said ignition switch; and manually retriggering said timer in the event of a stall of said belt carrier between said forward and rearward positions.

7. The method of claim 6 wherein said manual retriggering step includes hand-operating a manual switch.

8. The method of claim 6 wherein said manual retriggering step includes unbuckling an emergency release buckle from said belt carrier.

9. The method of claim 6 wherein said manual retriggering step includes retracting a belt into its retractor.

* * * * *